United States Patent [19]

Lee et al.

[11] Patent Number: 5,414,863
[45] Date of Patent: May 9, 1995

[54] POWER CONTROL STAGGERING CIRCUIT FOR POWERING DIFFERENT COMPONENTS AT DIFFERENT DELAY TIMINGS

[75] Inventors: Robert H. J. Lee, Palo Alto; John D. Kenny, Sunnyvale, both of Calif.

[73] Assignee: Cirrus Logic, Inc., Fremont, Calif.

[21] Appl. No.: 41,456

[22] Filed: Apr. 2, 1993

[51] Int. Cl.⁶ .......................... G06F 1/26; G06F 1/32
[52] U.S. Cl. ..................... 395/750; 364/707; 364/273.1; 364/273.3; 364/273.5; 364/271.5; 364/238; 364/DIG. 1; 318/445; 318/484; 307/141.4
[58] Field of Search ............... 395/750; 364/707, 492; 307/603, 606, 64, 141, 141.4; 340/825.06, 825.22; 370/112, 108; 318/445, 484

[56] References Cited

U.S. PATENT DOCUMENTS

| | | | |
|---|---|---|---|
| 3,651,454 | 3/1972 | Venema et al. | 340/459 |
| 4,062,007 | 12/1977 | Scott | 340/309.15 |
| 4,204,249 | 5/1980 | Dye et al. | 395/750 |
| 4,674,031 | 6/1987 | Siska, Jr. | 364/184 |
| 4,747,041 | 5/1988 | Engel et al. | 395/750 |
| 4,904,910 | 2/1990 | Hsu | 318/445 |
| 5,081,586 | 1/1992 | Barthel et al. | 364/424.05 |
| 5,210,450 | 5/1993 | Parkinson | 307/603 |
| 5,252,867 | 10/1993 | Sorrells et al. | 307/606 |

*Primary Examiner*—Gopal C. Ray
*Attorney, Agent, or Firm*—Oblon, Spivak, McClelland, Maier & Neustadt

[57] ABSTRACT

A power control circuit for a device such as a personal computer, including a laptop or notebook computer, which can conserve battery use, prevent power surges to promote longer battery charges and longer battery life, and can assure that circuitry is correctly biased. The power control circuitry of the present invention achieves these objectives by appropriately staggering the powering on of circuit components of the computer. A circuit for achieving these objectives may feature at least one memory for storing power control state data and a multiplexer for receiving the power control state data stored in the at least one memory. Further, a plurality of serially connected power control output circuits connected to the multiplexer output power control signals based on the power control state data stored in the at least one memory. A first of the plurality of serially connected power control output circuits has a minimum delay and each succeeding of the plurality of serially connected power control output circuits has an increasing delay.

8 Claims, 3 Drawing Sheets

POWER CONTROL STAGGERING CIRCUIT FOR POWERING DIFFERENT COMPONENTS AT DIFFERENT DELAY TIMINGS

BACKGROUND OF THE INVENTION

1. Field of the Invention

The present invention is directed to a power control circuit for a device such as a battery operated computer.

2. Discussion of the Background

A power control system for a device such as a battery operated computer, such as a laptop or notebook computer, operates to ensure that the appropriate computer components have power supplied thereto to be turned on based on the operation mode of the computer. For example, the computer may operate in several modes such as a doze mode, sleep mode, suspend mode, a fully-on mode and a fully-off mode. During these different modes, different components in the computer should be turned on and have power supplied thereto.

In a conventional computer power supply system, each of the specific components which are to have power supplied thereto based on the operation mode of the computer will be powered on at the same time. For example, in the fully-on mode, each of the computer components will have power supplied thereto at the same time.

However, such conventional power control systems suffer from significant drawbacks. First, by turning on each of the computer components which are to have power supplied thereto at the same time, power surges may be generated, which may limit battery life or damage the battery. Furthermore, in such a conventional power control system, certain components may be temporarily incorrectly biased particularly in power-on, power-off and power-state transition situations, causing damage to these components. Further, in such conventional power control systems, battery life is reduced as certain components may have power supplied thereto prior to the actual time required for them being turned on.

SUMMARY OF THE INVENTION

Accordingly, one object of the present invention is to provide a novel power control system which can prevent power surges and can promote longer battery charges and longer battery life by protecting the battery from damage. Further, the power control system of the present invention can ensure that circuitry is correctly biased.

Furthermore, the present invention can also increase battery life and increase operating efficiency by conserving the energy that the battery expends. As a result, computer design can be enhanced in that battery size may be reduced, thereby resulting in an overall reduction in size and weight of a laptop or notebook computer.

The power control system of the present invention achieves these objectives by appropriately staggering the turn-on times of particular computer components which are to be turned on based on the operation mode of the computer. In this way, power surges can be prevented and the battery life of the computer can be extended by delaying the time that certain components are turned on. In addition, this same power control staggering operation can also be used for isolating circuit elements to assure that the circuit elements are appropriately biased on or off before turning the circuit elements on or off.

More particularly, the power control system of the present invention achieves these objectives by featuring at least one memory for storing power control state data, which memory may be a register. A multiplexer receives the power control state data stored in the at least one memory. A plurality of serially connected power control output means are connected to the multiplexer and output power control signals based on the power control state data stored in the at least one memory. Further, the plurality of serially connected power control output means are structured so that a first of the plurality of serially connected power control output means has a minimum delay time and each of the succeeding of the plurality of serially connected power control output means has an increasing delay time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
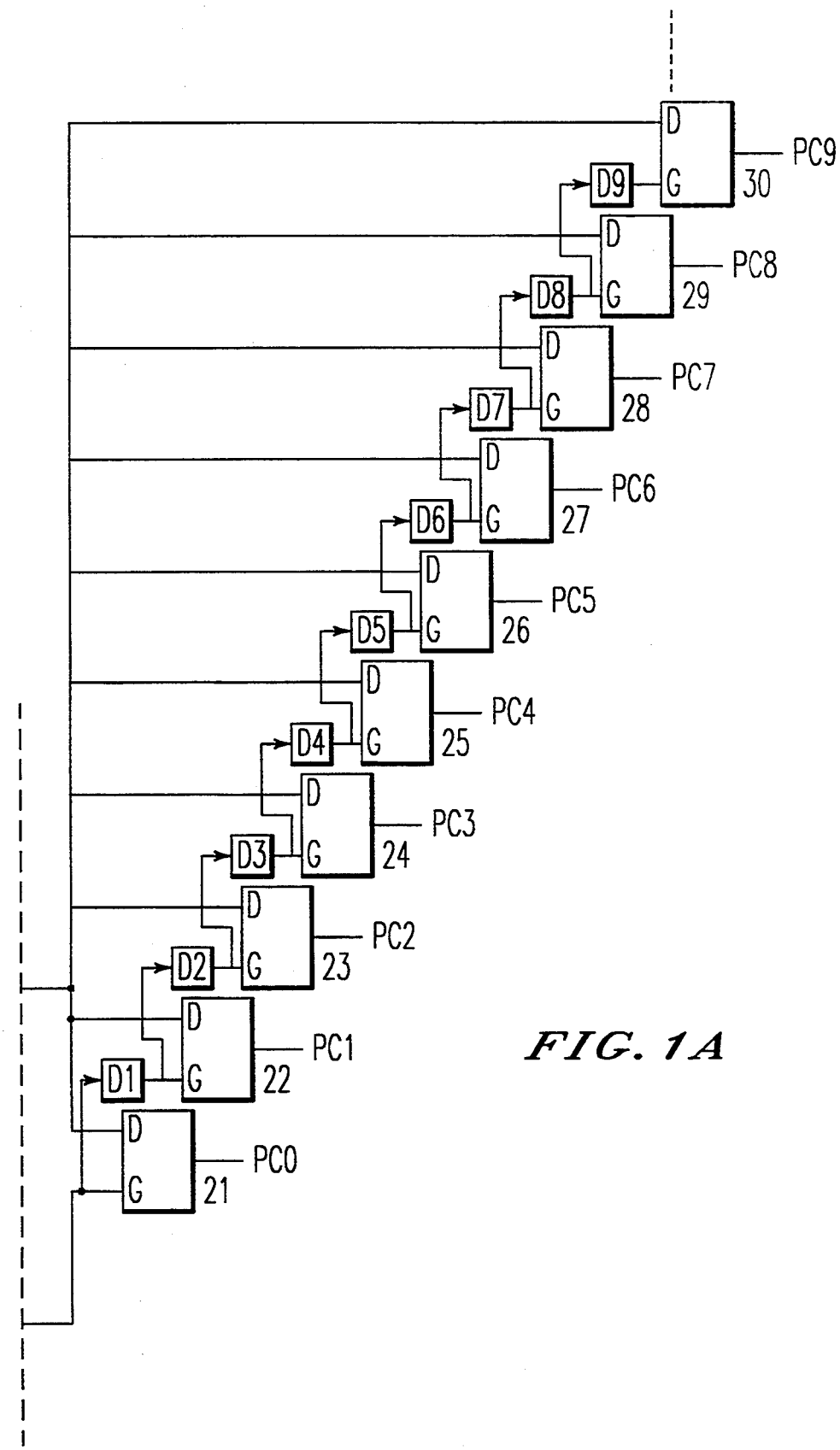
FIGS. 1A and 1B show a circuit which can achieve the staggered power control operation of the present invention.
Figure 1B:
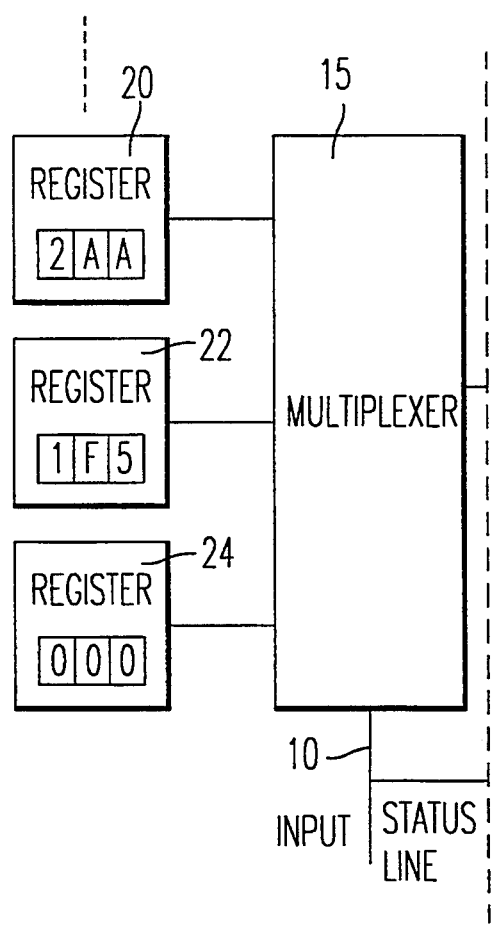

Referring now to the drawings, wherein like reference numerals designate identical or corresponding parts throughout the several views, and more particularly to FIGS. 1A and 1B thereof, there is shown a power control circuit which achieves the power staggering operation of the present invention.

In the simplest embodiment of the present invention, as shown in FIGS. 1A and 1B, an input status line 10 is used to select transitions from one power control state to the next. That is, a computer system can typically operate in several power control states. During each of the power control states, different computer components will have power supplied thereto. For example, typical power control states currently employed in computers are a doze mode, sleep mode, suspend mode, and fully-on and fully-off modes. These power control states are typified by having various circuit components or partitions of the computer system circuitry having power supplied thereto to be turned on.

Figure 2:
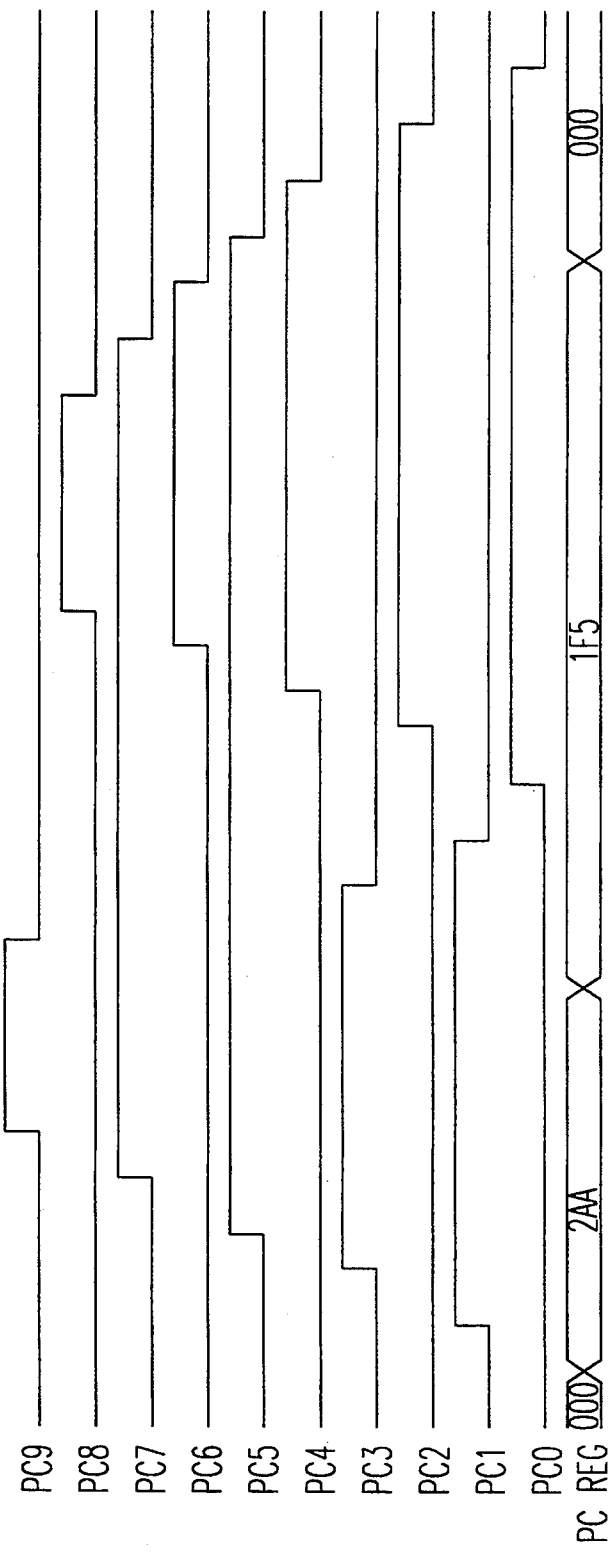
FIG. 2 shows a timing diagram with staggered power control signals according to the present invention.

As shown in FIGS. 1A and 1B, the input status line 10 is input into a multiplexer 15. Also connected to this multiplexer 15 are various registers 20, 22, 24. Three such registers are shown in FIG. 2, however fewer or more registers may be employed. These registers 20, 22, 24 store the power control state data. The input status line 10 through multiplexer 15 selects which power control state data stored in registers 20, 22, 24 should be implemented. The power control state data which is selected then controls which individual components of the computer have power supplied thereto to be turned on.

The data signal input on the input status line 10 used to select the power control state may be generated by being directly connected to some external control logic, such as an on-off switch (not shown), or the status output of an external sensing circuitry, such as a low battery detection status indicator (not shown), or the data signal input on input status line 10 may be generated by some internal state machine circuitry or microprocessor (not shown).

Also connected to multiplexer 15 are delay elements D1–D9 and latch elements 21–30, latch elements 21–30 being shown as flip-flops in FIGS. 1A and 1B. The output of each of these latch elements 21–30, indicated in FIG. 2 as respective power control outputs PC0–PC9, will be used to control which components of the computer have power supplied thereto to be powered on. Further, in the example shown in FIGS. 1A and 1B, ten power control outputs PC0–PC9 are shown, however, more or less power control outputs may be employed.

To effectuate the power staggering operation of the present invention, the input status line 10 is used as an input control signal to select the power control state data to be effectuated. That is, input status line 10 is used as a power control select to gate the power control state data stored in one of registers 20, 22, 24, to thereby output appropriate power control bits through power control outputs PC0–PC9 to each of the circuit components or the partitions of the system circuitry with varying degrees of delay.

According to an embodiment of the present invention, the input status line 10 is used as an input control signal. This is used to directly enable the first latch element 21, and as well is routed through the delay elements D1–D9. In the example shown in FIGS. 1A and 1B, as there are nine delay elements, there will be a total of ten power control outputs PC0–PC9, each succeeding one of which will generate a power control output at a subsequent point in time as a result of the routing through the delay elements D1–D9. That is, an output at power control output PC0 indicating a component connected thereto is to be powered on will be earlier than such an output at power control output PC1, which in turn will be earlier than such an output at power control output PC2, and so on until such an output at power control output PC9 has the greatest delay. These power control outputs PC0–PC9 are then used to individually control how power is applied to the different components or circuit partitions of the computer system connected thereto.

The delay elements D1–D9 may be any logic element which will delay transmission of a logic signal by a specific amount of time. Examples of such delay elements are chain logic flip-flops which, for example, could be clocked by some specific time generating circuitry, such as a combination of logic gates, microsequencing logic circuitry, etc.

Further, in the embodiment shown in FIGS. 1A and 1B, a register 20 may, for example, store the power control state data 2AA (hexidecimal), register 22 may store the power control state data 1F5 (hexidecimal) and register 24 may store the power control state data 000 (hexidecimal). Also, as noted above, other registers may also be added which may store other power control state data.

FIG. 2 shows an example in which input status line 10 controls multiplexer 15 so that the gated power control state data changes from 000 to 2AA to 1F5. In such an example, the input status line 10 will first gate the data stored in register 24 (power control state data 000), then gate the data stored in register 20 (power control state data 2AA) and then gate the data stored in register 22 (power control state data 1F5). In binary format, the power control bits output at power control outputs PC0–PC9 correspond to the above-noted hexidecimal power control state data would be as shown in TABLE 1 below.

TABLE 1

| | PC9 | PC8 | PC7 | PC6 | PC5 | PC4 | PC3 | PC2 | PC1 | PC0 |
|---|---|---|---|---|---|---|---|---|---|---|
| 000: | 0 | 0 | 0 | 0 | 0 | 0 | 0 | 0 | 0 | 0 |
| 2AA: | 1 | 0 | 1 | 0 | 1 | 0 | 1 | 0 | 1 | 0 |
| 1F5: | 0 | 1 | 1 | 1 | 1 | 1 | 0 | 1 | 0 | 1 |

In the examples shown in TABLE 1 above, when the power control state data 000 is gated by input status line 10 from register 24, each of the power control outputs PC0–PC9 will be at a logical low 0, indicating that no power will be applied to any components connected to these power control outputs PC0–PC9.

When the power control state data 2AA is then gated from register 20, power control outputs PC1, PC3, PC5, PC7 and PC9 will have outputs as a logical high 1, indicating that power should be supplied to the computer components connected to these power control outputs. Similarly, in this situation, power control outputs PC0, PC2, PC4, PC6 and PC8 will have logical lows 0 output therefrom, indicating that the computer components connected to these power control outputs will not be powered.

Furthermore, the staggering operation of these power control outputs PC0–PC9 is also shown in FIG. 2. As shown in FIG. 2, when the system makes the transition from power control state data 000 to power control state data 2AA, the first power control output to go to a logical high 1 is power control output PC1. As also shown in FIG. 2, power control output PC3 then goes to a logical high 1 after a predetermined delay after power control output PC1 has gone to the logical high 1. Power control output PC5 then goes to a logical high 1 after a predetermined delay after power control output PC3 has gone to a logical high 1, power control output PC7 goes to a logical high 1 after a predetermined delay after power control output PC5 has gone to a logical high 1 and power control output PC9 goes to a logical high 1 after a predetermined delay after power control output PC7 has gone to a logical high 1. Such a staggering operation can prevent power surges and decrease power usage.

As also shown in FIG. 2, the noted opposite transitions occur when the power state control data changes from 2AA to 1F5. This is the inverse to the operation in which the power control outputs were delayed when they were turned on. Specifically, as shown in FIG. 2, power control output PC9 is the first power control output to go to the logical low 0 after the transition from power control state data 2AA to power control state data 1F5. Then power control output PC3 goes to the logical low 0 after a predetermined delay after power control output PC9 has gone to the logical low 0, and power control output PC1 goes to the logical low 0 a predetermined delay after power control output PC3 has gone to a logical low 0. The other power control outputs PC7, PC5 maintain their level at the logical high 1 as these power control outputs are still at the logical high 1 when the power control state data 1F5 is gated. In this way, in the transition from the logical high to low, the power control output which has the greatest delay going from low to high will be the first power control output that went from high to low.

The example shown in FIG. 2 is an optimized implementation that staggers the power control signals on both the transition to the on or logical high condition and on the transition to the off or logical low condition. Alternatively, the power staggering could be implemented only on the transition from a logical low to a logical high, i.e., the transition from a power-off to a power-on, or on the vice versa condition.

In a further embodiment of the present invention, multiple input status lines 10 may be used. In such a further embodiment, the multiple input status lines may be routed through a set of delay elements in a prioritized fashion to create multiple power control outputs. These multiple power control outputs are again used to control power to individual system components or circuit partitions, as discussed above with respect to the embodiment shown in FIGS. 1A, 1B and 2.

In an alternative embodiment, individual system components can be turned on or off at any time while the rest of the system is in operation. That is, such a system using multiple input status lines may provide for a higher degree of control. To identify the power control state to the system user, some or all of the different input status lines can be connected to different external components or different parts of an external component, to reflect the status of different parts of the system or different states of the integrated circuit. Further, another implementation may allow for enabling either the staggered or unstaggered version of the power control outputs. This allows for removing the delays under certain conditions.

Furthermore, multiple input status lines can be combined, for instance, in a further multiplexer, to generate a single input status line which is then input into multiplexer 15 shown in FIGS. 1A and 1B. In addition, such multiple input status lines may have varying degrees of delay introduced before or after combining them to enable power control outputs. One or more sets of multiple input status lines can also be used to enable one or more sets of power control outputs.

An even more complex implementation of the present invention may allow for using multiple input status lines routed through a number of sets of variable delay elements in a prioritized fashion, the multiple input status lines then being routed through a number of multiplexer circuitries and enabling the output of multiple power control lines. In such an embodiment, the system may take all of the input status lines and feed them through a first set of variable delay elements with a certain staggering period, guided by a first set of control logic, and then a subset of the input status lines may be taken and fed through a second set of variable delay elements with a certain staggering period, guided by a second set of control logic. Such an implementation enables the output of the input status lines that are fed straight through only the first set of delay circuitry to be used as a first set of power control lines, and enables the subset that is routed through both the first and second sets of delay elements to be used as a second set of power control lines.

In the same fashion as the power control staggering operation of the present invention is used to prevent power surges to the battery, power control staggering can also be used to isolate circuitry in order to prevent damaging incorrectly biasing circuit elements or components, and thereby preventing damage to such circuitry. Such is the case in a liquid crystal display (LCD) flat panel display screen, for example.

Typically, a liquid crystal display would require three pins which are necessary to drive the LCD. These pins would or could need to be prioritized. In this situation, power control lines PC0, PC1, PC2 can provide the respective inputs for the three pins of the LCD.

Figure 3:
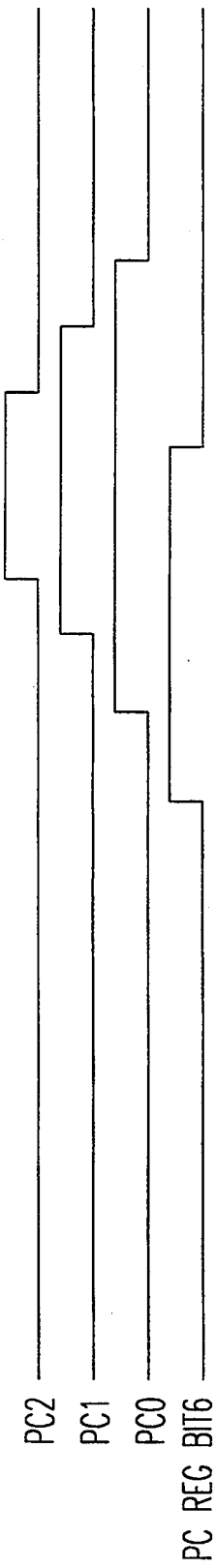
FIG. 3 shows one particular application of the staggered power control operation of the present invention.

By appropriately staggering the power control lines PC0, PC1, PC2 that have been enabled by the status line taken through successive circuit delay elements as shown in FIGS. 1A, 1B and 2, it can be guaranteed that the pin gated by power control output PC0 will make the transition to the logical high first, followed by power control output PC1, followed by power control output PC2, as shown in FIG. 3. Conversely, when these power control outputs PC0, PC1, PC2 transition from the logical high to the logical low, power control output PC2 is the power control line with the least delay allowing it to turn off first, i.e., proceed from a logical high 1 to a logical low 0, followed by power control output PC1 turning off after a predetermined delay and then power control output PC0 turning off after a predetermined delay. Such an operation ensures that the pin gated by power control output PC2 will not be active without the pins gated by power control outputs PC0 and PC1 being active first, thus preventing a possibly damaging reverse bias situation.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A power control apparatus for controlling an application of power control signals to a plurality of components to be powered, comprising:
   at least one memory for storing power control state data;
   a multiplexer for receiving the power control state data stored in the at least one memory; and
   a plurality of serially connected power control outputs connected to the multiplexer for outputting the power control signals based on the power control state data stored in the at least one memory, and wherein a first of the plurality of serially connected power control outputs has a minimum delay and each succeeding of the plurality of serially connected power control outputs has an increasing delay.

2. The power control apparatus according to claim 1, wherein a first of the plurality of serially connected power control outputs comprises a flip-flop and each succeeding of the plurality of serially connected power control outputs comprises a delay circuit and a flip-flop.

3. The power control apparatus according to claim 2, wherein the at least one memory comprises at least one register.

4. The power control apparatus according to claim 1, wherein the at least one memory comprises at least one register.

5. A power control apparatus for controlling an application of power control signals to a plurality of components to be powered, comprising:
   at least one memory means for storing power control state data;
   a multiplexer means for receiving the power control state data stored in the at least one memory means; and
   a plurality of serially connected power control output means connected to the multiplexer means for outputting the power control signals based on the power control state data stored in the at least one memory means, and wherein a first of the plurality of serially connected power control output means has a minimum delay and each succeeding of the plurality of serially connected power control output means has an increasing delay.

6. The power control apparatus according to claim 5, wherein a first of the plurality of serially connected power control output means comprises a flip-flop and each succeeding of the plurality of serially connected power control output means comprises a delay means and a flip-flop.

7. The power control apparatus according to claim 6, wherein the at least one memory means comprises at least one register.

8. The power control apparatus according to claim 5, wherein the at least one memory means comprises at least one register.

* * * * *